P. H. KROGER, Jr.
CORN PLANTER.
APPLICATION FILED APR. 25, 1913.
1,103,299.
Patented July 14, 1914.
2 SHEETS—SHEET 1.
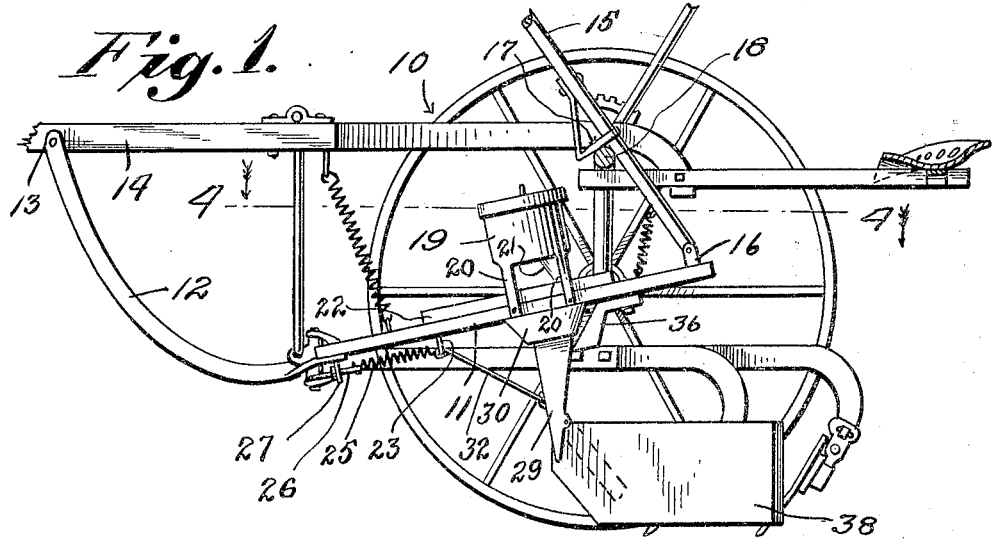
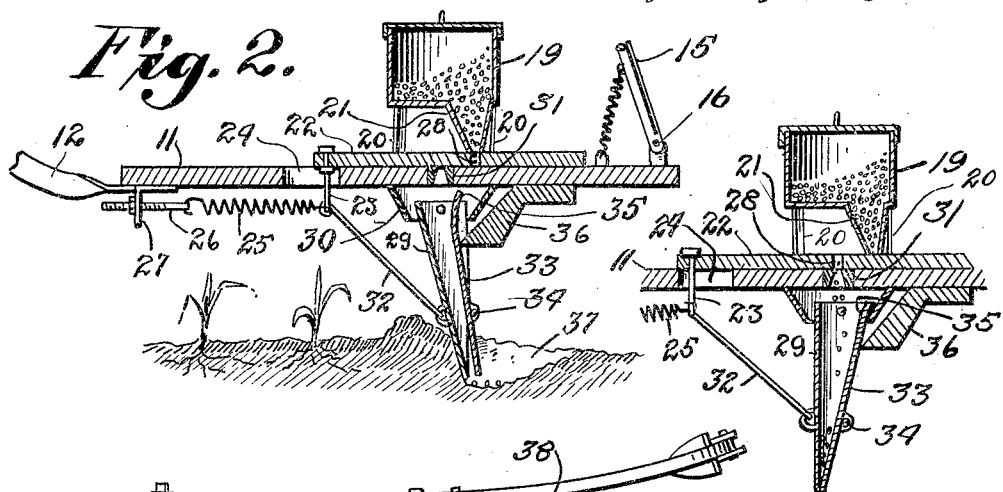
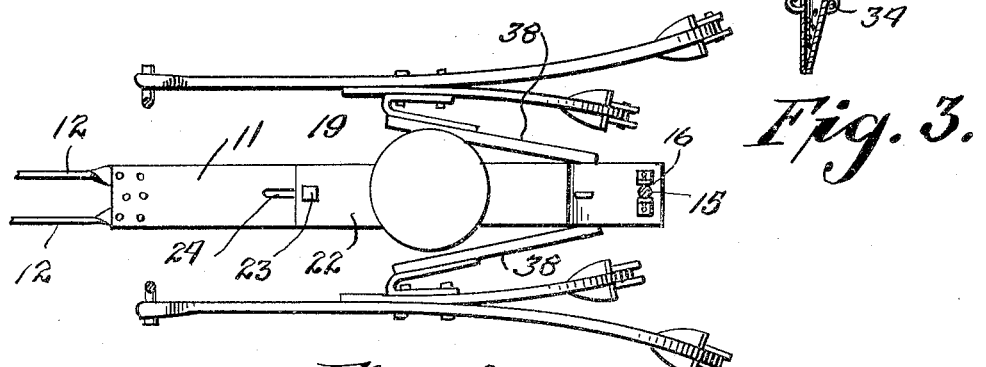
Witnesses
Inventor
P. H. Kroger, Jr.
By
Attorneys

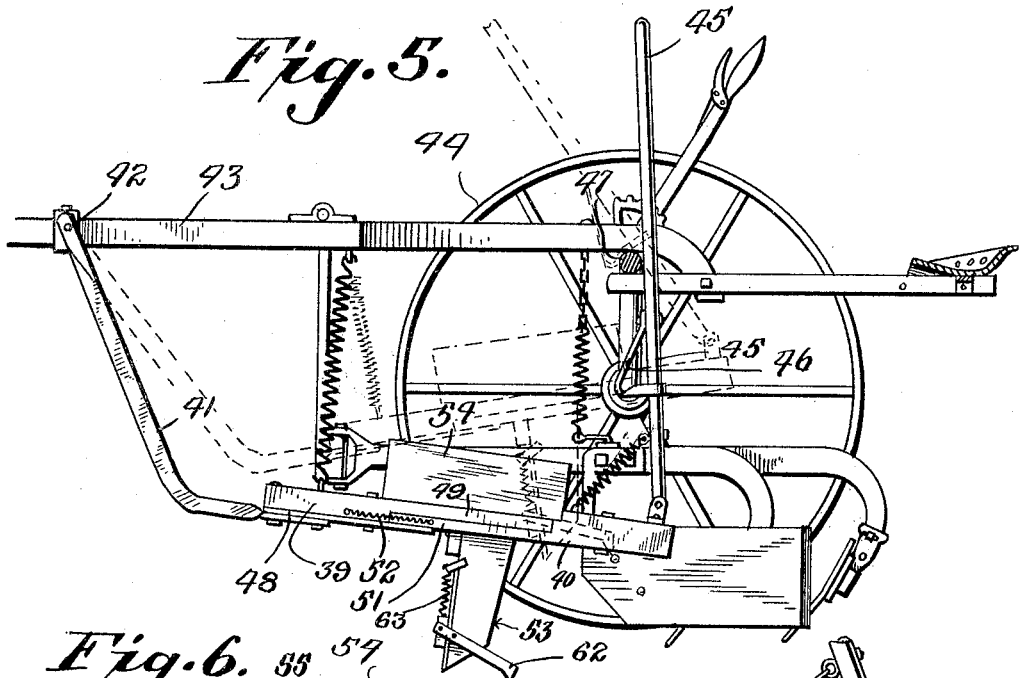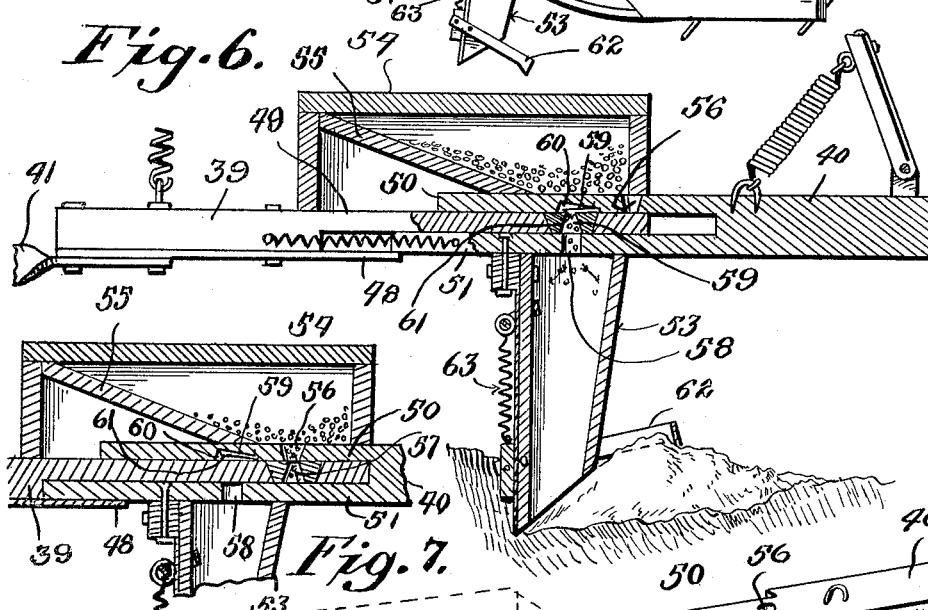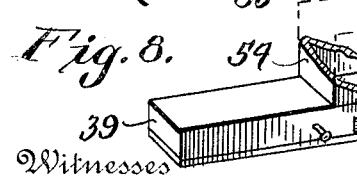

UNITED STATES PATENT OFFICE.

PETER H. KROGER, JR., OF WESSINGTON SPRINGS, SOUTH DAKOTA.

CORN-PLANTER.

1,103,299.  Specification of Letters Patent.  Patented July 14, 1914.

Application filed April 25, 1913. Serial No. 763,635.

*To all whom it may concern:*

Be it known that I, PETER H. KROGER, Jr., a citizen of the United States, residing at Wessington Springs, in the county of Jerauld, State of South Dakota, have invented certain new and useful Improvements in Corn-Planters; and I do hereby declare the following to be a full, clear, and exact description of the invention, such as will enable others skilled in the art to which it appertains to make and use the same.

This invention relates to planters designed for planting skipped hills when cultivating, and has for an object to provide a planter which has a ground penetrating spout adapted to actuate the feed valve when projected into the ground whereby a predetermined quantity of seed is dropped, the spout forming a furrow for the seed prior to dropping of the seed.

A further object is to provide a planter having means for storing a measured quantity of seed in the valve, such means being automatically actuated after each planting operation, whereby a predetermined quantity of seed will positively be dropped at each actuation of the valve by the spout.

With the above objects in view the invention consists of certain novel details of construction and combination of parts hereinafter fully described and claimed, it being understood that various modifications may be made in the minor details of construction within the scope of the appended claims.

In the accompanying drawings illustrating this invention:—Figure 1 is a longitudinal sectional view through a cultivator equipped with the preferred form of my invention. Fig. 2 is a longitudinal sectional view through the planter showing the parts in position to drop the seed. Fig. 3 is a longitudinal sectional view through the planter showing the parts in normal position. Fig. 4 is a plan view. Fig. 5 is a longitudinal side elevation of a cultivator equipped with a modified form of the invention. Fig. 6 is a longitudinal sectional view through the modified form with the parts in seed dropping position. Fig. 7 is a fragmentary longitudinal sectional view through the modified form with the parts in normal position. Fig. 8 is a detail perspective view of the base plate. Fig. 9 is a detail perspective view of the valve.

Referring now to the drawings in which like characters of reference designate similar parts, 10 designates in general an ordinary cultivator. The planter attachment comprising the subject-matter of this invention consists of a flat bar 11 that carries at the forward end a pair of curved arms 12 which are pivotally secured at the upper ends as shown at 13 to the cultivator beam 14. A lever 15 is hinged to the rear end of the bar as shown at 16 and is provided with a stop 17 which is hooked over the axle 18 of the cultivator to secure the planter in its inoperative position.

A hopper 19 for the reception of seeds is provided with legs 20 which are secured to the edges of the bar 11. The hopper is provided in the bottom with a spout 21.

A slide valve 22 in the nature of a flat bar is fitted on the top face of the bar 11 between the legs of the hopper and is provided with a depending pin 23 which projects through a slot 24 in the bar 11, there being a helical spring 25 disposed below the bar 11 and connected to the pin 23 and to a suitable adjusting eye bolt 26 carried by a bracket 27 secured to the bottom face of the bar 11. The valve is provided with a seed receiving opening 28 which is adapted to receive the seeds from the hopper spout 21 and is normally held in registration with the spout and at its forward limit of sliding movement by the spring 25, such limit of movement being controlled by contact of the pin 23 with the forward end of the slot 24. Thus the seed opening 28 is normally full of seeds, the quantity of seeds therein being determined by the size of the seed opening.

A substantially conical spout 29 is pivoted at the top to a frusto-conical base 30 which is fixed to the bottom face of the bar 11 and registers with an outlet opening 31 that is so arranged as normally to be out of registration with and in rear of the valve opening 28 as best shown in Fig. 3. The spout is connected by a link 32 to the above mentioned pin 23. The spout is further provided on the rear side with a vertically extending door 33 that is pivoted as shown at 34 intermediate the ends to the body of the spout and is normally held closed to seal the outlet end of the spout by means of an outturned lip 35 formed on the top edge of the spout contacting with the inner wall of the base 30. An angular abutment block

36 is secured to the bottom face of the bar 11 for a purpose which will be presently described.

Suppose the planter to be in raised position as shown in Fig. 1 and it is desired to replant a hill when cultivating. The lever 15 is released from the cultivator axle 18 and forced downward to project the spout into the hill. As the cultivator advances the spout will be drawn along thereby gouging out a furrow 37 for the reception of the seed, while at the same time the drag of the spout in the soil will rock the spout on its pivot with a resultant impinging of the upper end of the door against the above described abutment block 36, and resultant opening of the door as shown in Fig. 2, thus dropping the seed which has gravitated through the opening 31 to the spout 29. At the same time the spout is rocked on its pivot, the valve 22 is drawn back by the link 32 and pin 23 against the tension of the spring 25 until the pin contacts with the rear end of the slot 24 in which position of the parts the valve opening 28 arrives in registration with the opening so that when the spout 29 is raised to its inoperative position the valve 22 will be drawn forwardly by the spring 25, whereupon the opening 28 will register with the opening 31, thus depositing a charge of seed in the spout 29, as shown in Fig. 3.

A pair of divergent coverer plates 38 are secured to the cultivator on opposite sides of the planter as shown in Fig. 4 and serve to cover the seeds in the furrow after progress of the planter therebeyond at the termination of the planting operation.

In Figs. 5 to 9 inclusive is shown a modified form of the invention which in this instance operates practically the same as the preferred form above described. The modification comprises an interfitting base plate 39 and valve 40, the base plate being provided at the forward end with attaching links 41 which are pivotally connected at the upper ends as shown at 42 to the beams 43 of the cultivator 44. The valve is provided at the rear end with an upstanding pivoted lever 45 which is equipped with a stop 46 that engages with the axle 47 of the cultivator and normally holds the cultivator in raised or released position. The base plate 39 is equipped on the bottom face with a guide plate 48 and is further equipped with a forwardly projecting tongue 49 above and parallel with the guide plate. The valve 40 is provided with an upper forwardly projecting short tongue 50 and with a lower forwardly projecting long tongue 51 between which tongues the tongue 49 of the base plate is received, with the long tongue 51 of the valve projecting into the space between the guide plate 48 and bottom face of the tongue 49 of the base plate. A helical spring 52 is secured to the base plate and long tongue of the valve and normally holds the base plate and valve at their inner limit of interfitting movement.

A spout 53 is disposed on the bottom face of the valve tongue 51 and when this spout is projected into the ground, the valve is anchored while the base plate is drawn forwardly therefrom against the tension of the spring 52 with a resultant dropping of seed as will now be described.

Disposed on the tongue 49 of the base plate is a hopper 54 into which the short tongue 50 of the valve projects and forms a bottom for the hopper, there being an inclined partition 55 in the hopper which holds the seed banked up at the rear end of the hopper on top of the valve tongue 50. An opening 56 is formed in the valve tongue 50 and is normally in registration with an opening 57 in the tongue 49 of the base plate as shown in Fig. 7, both of these openings storing a predetermined quantity of seed from the hopper. An opening 58 is formed in the lower tongue 51 of the valve and registers with the spout. When the tongue 49 of the base plate is carried forwardly, the seeds in the opening 57 drop through the opening 58 into the spout.

For forcing the seeds from the opening 57 at each operation, a leaf spring 59 is secured in a recess 60 formed on the bottom face of the valve upper tongue 50 in advance of the opening 56 thereof, this leaf spring terminating in a projection 61 which enters the opening 57, see Fig. 6 and forces the seeds therefrom when the parts are in operative position. The spout is equipped near the delivery end with a hinged arm 62 which is normally held depressed by a helical spring 63 carried on the spout, this arm riding upon the soil and being actuated by a spring to assist in raising the spout out of the ground when the operating lever 45 is raised.

In both forms of the invention it will be noted that the spout serves to anchor the valve while the base plate is drawn forwardly from the latter to bring the seed openings into registration for dropping the seed through the spout, and furthermore that when the device is released a predetermined quantity of seed is stored in the valve opening so that the planter will positively drop seeds at each penetration of the spout into the soil.

What is claimed, is:—

1. A planter including a hopper, sliding bars formed with respective ports disposed in operative relation with said hopper and forming a valve, a conical ground engaging seed delivery spout pivoted on said valve, a pivoted door forming the rear wall of said spout and weighted at the upper end whereby the door is normally rocked inwardly at the lower end to seal the delivery opening of said spout, a stop carried by said valve adapted to impinge against the upper end of said door at each rearward swinging movement of said spout and open the door with a resultant discharge of seed from said spout, and means operatively connecting said spout to said valve whereby swinging movement of said spout serves to operate said valve.

2. A planter including an upper and a lower straight bar slidably bearing one upon the other and provided with respective ports normally in registration with each other, a pin carried by the upper bar slidably projecting through a slot in the lower bar, a conical ground engaging seed delivery spout pivoted on the lower bar below its port and operatively connected to said pin whereby rearward swinging movement of said spout serves to move said upper bar and dispose its port out of registration with the port of the lower bar, a hopper adapted to register with the port in the upper bar when the latter is actuated to its limit of movement by said spout, a spring connected to said pin and to said lower bar for returning said spout and said upper bar to normal position after each operation, a pivoted door forming the rear wall of said spout and weighted at the upper end whereby the door is normally rocked inwardly at the lower end to seal the delivery opening of said spout, and a stop carried by said lower bar adapted to impinge against the upper end of said door at each rearward swinging movement of said spout with a resultant discharge of seed from the spout.

In testimony whereof, I affix my signature, in the presence of two witnesses.

PETER H. KROGER, JR.

Witnesses:
E. R. BUCK,
VERNON VESSEY.